United States Patent [19]

Ostreicher et al.

[11] Patent Number: 5,015,316
[45] Date of Patent: * May 14, 1991

[54] FILTER ELEMENT

[75] Inventors: Eugene A. Ostreicher, Farmington, Conn.; Joseph R. Infantino, Chappaqua, N.Y.

[73] Assignee: Cuno, Incorporated, Meriden, Conn.

[*] Notice: The portion of the term of this patent subsequent to Feb. 16, 2005 has been disclaimed.

[21] Appl. No.: 406,852

[22] Filed: Sep. 13, 1989

Related U.S. Application Data

[60] Continuation of Ser. No. 153,874, Feb. 8, 1988, abandoned, which is a continuation of Ser. No. 38,078, Apr. 14, 1987, Pat. No. 4,725,323, which is a division of Ser. No. 736,873, May 22, 1985, abandoned.

[51] Int. Cl.$^5$ ........................... B65B 7/28; B01D 27/08
[52] U.S. Cl. ................................ 156/69; 156/303.1; 156/306.6; 156/309.6; 55/502; 210/94; 210/450
[58] Field of Search ................ 55/502; 210/94, 95, 210/232, 238, 348, 450, 452, 493.2, 496, 497.01, 506, 508, 509; 156/69, 293, 303.1, 308.4, 306.6, 309.6

[56] References Cited

U.S. PATENT DOCUMENTS

| | | | |
|---|---|---|---|
| 2,539,768 | 1/1951 | Anderson | 210/496 |
| 2,642,187 | 6/1953 | Bell | 210/493.2 |
| 2,726,184 | 12/1955 | Cox | 210/493.2 |
| 2,739,916 | 3/1956 | Parker | 210/493.2 |
| 2,771,156 | 11/1956 | Kasten | 210/493.1 |
| 3,002,870 | 10/1961 | Belgarde | 210/94 |
| 3,164,506 | 1/1965 | Lake | 210/493.2 |
| 3,397,518 | 8/1968 | Rogers | 55/502 |
| 3,720,323 | 3/1973 | Landree | 210/493.2 |
| 3,884,662 | 5/1975 | Hladik | 55/502 |
| 3,989,491 | 11/1976 | Pelosi | 55/502 |
| 4,038,194 | 7/1977 | Luceyk | 210/493.2 |
| 4,159,197 | 6/1979 | Schuler | 55/502 |
| 4,391,384 | 7/1983 | Moore | 220/307 |
| 4,464,263 | 8/1984 | Brownell | 210/493.2 |
| 4,725,323 | 2/1988 | Ostreicher | 156/69 |

FOREIGN PATENT DOCUMENTS

| | | | |
|---|---|---|---|
| 2429474 | 6/1975 | Fed. Rep. of Germany | 210/493.2 |
| 2620148 | 12/1976 | Fed. Rep. of Germany | 55/502 |
| 3208438 | 9/1983 | Fed. Rep. of Germany | 55/502 |
| 2266535 | 4/1974 | France | 210/493.2 |
| 55-159822 | 10/1980 | Japan | 55/502 |
| 56-10084 | 3/1981 | Japan | 55/502 |
| 59-85472 | 5/1984 | Japan | 55/502 |
| 689595 | 4/1953 | United Kingdom | 210/493.2 |
| 1334002 | 10/1973 | United Kingdom | 210/493.2 |
| 2048109 | 12/1980 | United Kingdom | 210/493.2 |
| 2134811 | 8/1984 | United Kingdom | 210/493.2 |
| 2140317 | 11/1984 | United Kingdom | 210/493.2 |

Primary Examiner—Ernest G. Therkorn
Attorney, Agent, or Firm—Renner, Kenner, Greive, Bobak, Taylor & Weber

[57] ABSTRACT

A filter element adapted to be sealingly clamped in a filter housing. The element comprises a porous hollow cylindrical integral self-supporting bonded fibrous structure. The structure has thermally melt bonded to at least one end thereof, a thermoplastic polymer closed cell foam sealing gasket. The gasket is adapted to provide a sealing surface between the end of the cartridge and the sealing edge of the filter housing. In a preferred embodiment, the sealing edges of the filter housing used in conjunction with the aforedescribed filter element comprises at least two circular sealing edges concentric to the axis of the cylinder filter element. Such a combination provides a means for determining whether there is leakage past the sealing edges by the discoloration of the sealing gasket area between the concentric sealing edge by the liquid being filtered.

6 Claims, 2 Drawing Sheets

FILTER ELEMENT

This application is a continuation of Ser. No. 153,874, filed Feb. 8, 1988, now abandoned, which is a continuation of Ser. No. 038, 078, filed Apr. 14, 1987, now U.S. Pat. No. 4,725,323, which is a division of Ser. No. 736,873, filed May 22, 1985, now abandoned.

FIELD OF THE INVENTION

This invention relates to filter elements and in particular a means for providing a novel gasket means for sealing the ends of the filter element in a filter housing.

PRIOR ART

Filter elements which are porous hollow cylindrical interal self-supporting resin bonded fiber structures are well known in the art. Preferred embodiments of such filters are described in U.S. Pat. Nos. 2,539,767 and 2,539,768 to Anderson and sold by the Assignee herein under the trademark MICRO-KLEAN (AMF Cuno General Filtration Division, Meriden, Conn.) wherein the bonding system is a thermosetting resin. Another preferred embodiment of the filter element is described in U.S. Pat. Nos. 4,100,009 and 4,197,156 to Nakajma et al wherein the bonding means is melt bonding of thermoplastic fiber. Broadly, these filter elements are relatively rigid, self-supporting, thick-walled, tubular members composed entirely of a bonded fibrous material. The filter elements are used for filtering liquids and gases by flowing radially inwardly under a differential pressure.

Typically the filter elements are designed to obtain maximum filter efficiency by providing a fibrous structure of a graded porosity, with the size of the pores progressively increasing radially outwardly toward the outer surface. By virtue of such graduated porosity, or density, as the fluid flows inwardly through progressively smaller and more numerous interstices, the particulate contaminant to be filtered out penetrates to varying depths according to their size. Thus, the filter elements can accomodate more solids without effecting flow, with a consequently longer, effective life before the elements need replacing.

For example, in Anderson, the graduated porosity in the filter elements is accomplished by accreting resin-impregnated fibers from an aqueous uniform dispersion of such fibers under controlled conditions as to the amount of vacuum used in effecting such accretion and as to the composition and characteristics of the fibrous stock used.

Typically, these filter elements are adapted to be sealingly clamped in a filter housing. At each end of the cartridge, a sealing edge of the filter housing engages the end of the cartridge to provide a seal to prevent bypass of the contaminants being filtered from the liquid. Typically, the sealing edge is a circular sealing lip or knife edge protruding from the housing which engages the end of the filter element and is concentric with the axis of the filter. A sealing edge engages each end of the filter cartridge element. The sealing edge is embedded into the end of the fibrous structure to provide a seal between the edge and filter element. A compression spring means or clamping means is used to provide sufficient force to embed the sealing edge of the housing into the end of the filter cartridge element.

The foregoing technique for sealing is adequate for relatively open type or porous filter elements, i.e. "low efficiency" filter cartridges, since the cartridges are relatively soft, permitting the sealing edge of the housing to embed itself into the cartridge end.

In recent years, however, customers have demanded tighter and more efficient type filter elements. Such high efficiency filter elements require an extremely effective sealing means to prevent the by-pass of the filter by the contaminant particles. Typically the high efficiency filter elements tend to be very hard. Such structures, by their very nature, make it difficult to achieve the proper embedding of the sealing edge of the filter housing into the cartridge end to provide adequate sealing. For example, a typical cartridge wall is about $\frac{3}{4}$ of an inch thick. In order to obtain adequate filtration the fluid should pass through this complete wall thickness to achieve the desired filtration results. If sealing is not adequate the fluid will go over the end of the cartridge underneath the sealing edge of the housing and into the fluid outlet thus contaminating the filtered fluid. This can, if there is enough particulate in the fluid being filtered, cure itself in that the particulate will clog this area and provide sufficient filtration efficiency. However, during start-up this by-pass can result in significant loss of filtration efficiency.

Attempts have been made to solve this problem, for example, by adhesively bonding an elastomeric flat gasket to the ends of the cartridge. Such gaskets are not completely satisfactory due to the fact that the adhesive may not be solvent resistant to the liquid being filtered and the gasket can swell. The adhesive rapidly leach out and disappear causing contamination of the products and the elastomer gasket swells and disintegrates causing leakage problems. Additionally, elastomeric gaskets can be very expensive. Attempts have been made to design solid or rigid injection molded plastic end caps which are attached to the ends of theses filter elements by means of spin welding, ultrasonic bonding, melt bonding, etc. These end caps, in turn, utilize elastomeric O-rings and/or flat gaskets which are retained in the end caps to provide the necessary sealing engagement with the filter housing. Such a solution to the aforedescribed problem is expensive and adds considerable cost to the filter cartridge element not warranted by the type fluids being filtered.

Another problem associated with these type of filter cartridge elements is that it is difficult to quickly and efficiently determine whether there is bypass of the contaminant pass the housing sealing edge. This invention provides a unique simple and efficient way of determining whether there has been leakage past the sealing edges of the filter cartridges.

Various means are known for sealing the ends of filters, none of which are applicable to the type filters described herein and/or are expensive and inefficient in use. For example, U.S. Pat. No. 2,726,184 to Cox et al describes a method for improving the end seals of a pleated or convoluted type filter element. The method includes depositing an amount of unpolymerized, thermosetting adhesive in liquid form on the surface of end discs, allowing the deposited adhesive to harden, and then press fitting the end discs onto the end of the filter element. The adhesive may be in the form of a precut solid adhesive ring which is placed in the disc. This method is complicated and expensive and requires preformed end discs to be sealed to the end of the filter element.

U.S. Pat. No. 2,771,156 to Kasten et al describes a pleated filter element and resilient plastic end caps, the pleated filter element being embedded therein. In a process of molding the end cap the ends of the pleated element are immersed in a mold filled with a plastic composition and cured. When the filter element is removed from the mold the ends of the pleats are covered with a tough rubber-like product, i.e. a "plastisol"—a vinyl resin with filters, pigments, plasticizers and/or stabilizers. Such a "plastisols" tend to have low temperature limits and are incompatible with many solvents.

Additionally, foamed polyethylene and its copolymers are well known in the art and sold under the trademarks VOLARA and MINICEL by Voltek and known to be useful as a gasketing material. Such a material, however, has not to Applicant's knowledge, been utilized in sealing filter elements of the type used in this invention.

OBJECTS AND SUMMARY OF THE INVENTION

It is an object of this invention to provide a filter element having improved means thereon for sealing the ends thereof in a filter housing.

A further object of this invention is to provide a depth type filter element with a sealing gasket on at least one end which prevents contaminant bypass between the filter housing and filter element.

Still another object of this invention is to provide a filter element with a sealing gasket which is compatible with a broad range of fluids to be filtered.

Yet another object of the present invention it to provide a filter element having a sealing gasket which is permanently attached to the filter element without the use of other components which jeopardize the compatibility of the filter element/gasket combination with the fluids being filtered.

A further object of this invention is to provide a combination filter element, and housing which has a seal means thereon which clearly indicates whether there is by-pass of the filter.

All of the foregoing objects are accomplished by a filter element adapted to be sealingly clamped in a filter housing along a sealing edge thereof. The filter element comprises a porous hollow cylindrical, integral self-supporting bonded fibrous structure having thermally melt bonded to at least one end thereof, a thermoplastic polymer closed cell foam sealing gasket. The gasket provides an effective sealing surface between the end of the cartridge and a sealing edge of the filter housing.

In a preferred embodiment, the filter element is used in combination with a filter housing wherein the sealing edge of the filter housing comprises at least two circular sealing edges concentric to the axis of the cylindrical filter element to provide an indicia area on the gasket between the concentric sealing edges which discolors upon exposure to the fluid being filtered to indicate by-pass of the fluid around the sealing edges. Discoloration of this indicia area will indicate bypass of contaminated fluid past the sealing edges.

DETAILED DESCRIPTION OF THE INVENTION

Figure 1:
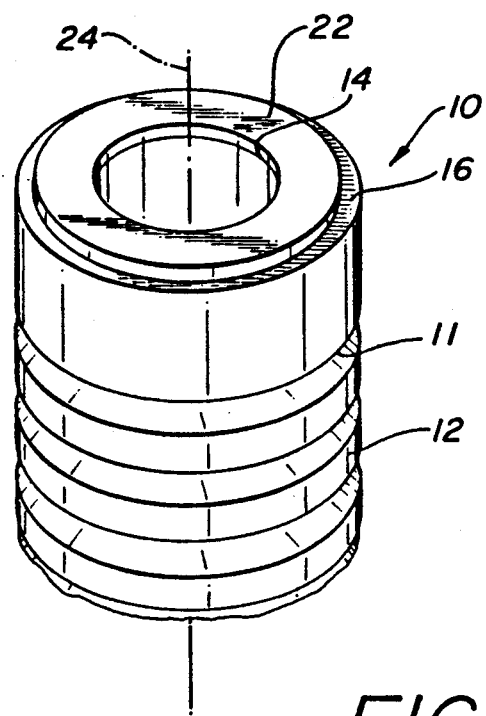
FIG. 1 is a perspective view of one end of the filter element of this invention.

Referring to FIGS. 1-6, the filter elements used in this invention are well known in the art. As previously indicated these are produced, for example, as described in Assignee's U.S. Pat. No. 2,539,767 and U.S. Pat. No. 2,539,768 to Anderson, the entire disclosures of which are incorporated herein by reference. The filter elements 10, which this invention is an improvement thereon, have been sold under the trademark Micro-Klean, by AMF Cuno General Filtration Division, Meriden, Conn. Referring to FIG. 1, this filter element 10 comprises a relatively rigid self-supporting thick-walled, tubular member composed entirely of resin-impregnated and bonded fibrous material.

Typically such cartridges have deep grooving 11 around the periphery or outer surfaces 12 to increase their dirt holding capacity and to prevent premature binding of the surface of the filter element by large particles.

Figure 2:
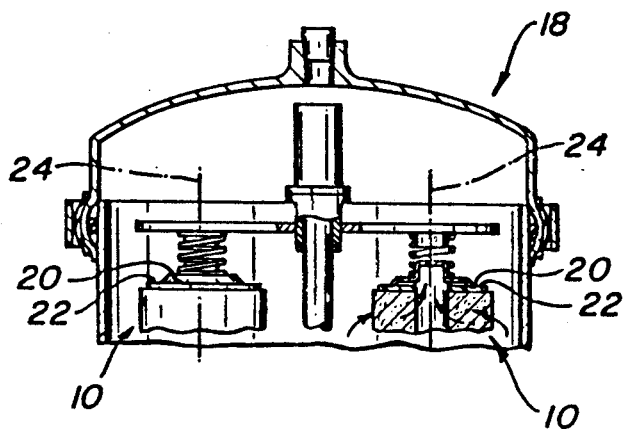
FIG. 2 is a partial cross-sectional view showing the filter element of this invention utilized in a filter housing.

The element 10 is intended to be used for filtering liquids and gases which are caused to flow radially inward under a differential pressure (see FIG. 2). In order to obtain the maximum filtering efficiency, the fibrous structure of the filter element 10 is of a graded porosity, with the size of the pores progressively increasing radially outwardly toward the outer surface 12. By virtue of such graduated porosity, or density, as the fluid flows inwardly through progressively smaller and more numerous intersticies, the particulate contaminants to be filtered penetrate to varying depths according to their size.

Such graduated porosity in a filter element is accomplished by accreting-impregnated fibers from an aqueous uniform dispersion of fibers under controlled conditions of vacuum, composition and fiber characteristics.

The fibrous material employed in making the filter element can be wool, esparto, yucca, cellulose (e.g. wood), glass, acrylic, rayon or admixtures thereof.

The fibers are mixed with a dispersion of resin particles or resin forming ingredients, either in the form of water or alcohol dispersion. Subsequently, one or more perforate formers or dies are immersed in the suspension in a felting tank holding the dispersion of solvent, resin and fibers and the resin impregnated fibers are caused to be accreted upon the formers by application of a controlled degree of suction imposed upon the interior of the formers. By the control of the degree of vacuum and the length of time over which the vacuum is applied, in conjunction with the proper control of the characteristics of the fiber, a filter carcass is produced of the depth, or thickness and graded porosity that is desired. The proportion of resin in the fibrous carcass is also a factor when producing a filter element of the desired degree of strength and hardness to withstand the pressure drop to which it may be subjected to use.

In order to impart to the filter element strength and rigidity, as well as to water proof the fibers so that they will not become soggy, or soft in the presence of water or other fluids, a resin is used to impregnate the fibers and to bond them together in a relatively fixed relationship. The amount of resin used may vary between 15% and 60% by total weight of the filter element. Various resins including thermosetting resins such as phenol formaldehyde condensation products, urea formaldehyde condensation products and the malamine resins may be used. Thermoplastic resins may also be employed, such as polystyrene. Preferred resins are melamine and phenolic resins.

After formation of the wet carcass, a substantial proportion of the water or other solvent is removed by drawing hot air through the filter carcass. After drying, the resin is set by blowing air through the filter carcass under controlled temperature and controlled time condition. By passing the air through the carcass in one direction to remove the solvent or water and the other diection during the setting of the resin, the uniform distribution of resin throughout the mass of the carcass is substantially affected. After setting, the filter carcass is cured by heat under temperature and time conditions appropriate for the curing of the particular resin used.

In the final step, the filter cartridge is sized to accurate dimensions by cutting or trimming mechanically as by means of a knife, saw or grinder. (see the '767 patent to Anderson).

Referring to FIG. 1, the finished filter element 10, comprises a thick hollow wall cylindrical catridge having concentric outer and inner cylindrical surfaces 12 and 14, respectively, and end surface 16 on each end of the cylinder 10. In use fluid enters from the outside 12 of the cartridge 10, passes through the thick wall of the cartridge and is collected in the core and then passes to the point of use.

Typically the filter elements are limited to a maximum operating temperature of up to 250° F. The filter elements, typically, can withstand differential pressures up to 16 psid but are operated in the 25 to 35 psid range.

Another preferred filter element is exemplified in U.S. Pat. No. 4,100,009 to Nakajima, the entire disclosure of which is incorporated herein by reference. The filter elements are stablized by hot adhesion. The method of producing such filter elements comprises passing a web of a gathered fiber layer carried on a conveyor belt through a heating zone. The web is then heated in such a way that a lower-melting component of composite fiber contained in the lower part of the web contacting the conveyor belt is not in the molten state and a lower-melting component contained in the upper part of the web is in the molten state. The web is then separated from the conveyor belt, wound on a take-up rod or tube in such a way that the upper surface thereof occupies the inner side of the winding, while heating the web further, cooling the wound up article and drawing out the take-up rod or tube from the shaped product.

The cartridges may be used in varying lengths or multiples of a single lenght, stacked one on top of another. In such arrangements all the cartridges in multiple height stack arrangements are fastened together by a cement, e.g. polypropylene, to assure alignment and permanent bonding for positive sealing against bypass.

The filter elements may be used for removing particulate contaminents which are fibrous, abrasive or gelatinous from fluids such as gas, alcohol, glycols, coolants, fuels, oils, lubricants, cosmetics, paints and varnishes, syrups, compressed air, water or sensitive process liquids, e.g. demineralized water, food products, beverages, photographic solutions and, particularly, "dope" for producing magnetic recording tapes.

Referring to FIGS. 1-4, thermally bonded to at least one end 16, and preferably each end of the filter element 10 thereof is a thermoplastic polymer closed cell foamed sealing gasket 22. Each gasket 22 provides an effective sealing surface between the end of the cartridge 16 and the sealing edge 20 of the filter housing 18. Peferably the polymer is a polyolefin, e.g. polyethylene or polypropylene. Such materials are chemically compatible with most of the liquids and gases to be filtered by the elements herein. Due to the characteristics of the ploymer, a polyethylene closed cell foam is preferred. Such foams are known in the art, with a preferred brand being sold by Voltek of Lawrence, Mass. under the name VOLARA and MINICEL, with the VOLARA brand being preferred. This polymer is a radiation-cross-linked polyethylene foam having a fine cell structure and a smooth surface. In particular, the preferred VOLARA 6A has a thickness of about 1/16th of an inch and has the following properties:

(a) Compressive strength at 50% deflection of 25 to 31 psi (by ASTM D-1056)
(b) Tensile strength of 125-148 psi (by ASTM D-1564)
(c) Elongation of 178-220% (by ASTM D-1564)
(d) Tear strength 28-35 lbs/in. (by ASTM D-624).

The gasket is typically in the form of a donut shaped disc circle which is adhered to the filter end 16 concentric with the central axis 24. Typically the gasket may be of a diameter somewhat smaller than the outside diameter of the filter element 10, and have an inside diameter somewhat larger than the internal diameter of the filter element. Typically the discs are 1/16 to 3/32 of an inch thick. This dimension could be increased if necessary to compensate for toublesome sealing configurations that require more resiliency or depth to provide sufficient sealing. The foam is obtained in sheet form and cut into discs of the desired size and shape.

The gasket 22 is applied to the filter element 10 by heating the end 16 of the element 10 to a temperature sufficiently high to thermally melt bond the gasket 22 to the cartridge end 16 when the gasket is contacted to the hard cartridge surface. Such temperature may be determined readily and is empirically derived but is below the temperature at which the cartridge starts to deteriorate, melt and/or fuse and is also below a temperature that completely melts the gasket. However, it has been found that the cells inside the gasketing material insulate the heated lower surface in contact with the heated end 16 of the filter 10 from the remaining portion of the gasketing material and thus only the lower surface of the gasket is sufficiently heated to melt bond itself to the end 16 of the filter element 10. Such heating can be accomplished with a hot plate, infared energy, hot air etc. There are a number of techniques available for heating the end of the cartridge which are simple to accomplish and to automate.

The closed cell configuration of the polymer is also desirable because it provides resiliency or spring back that allows compensation for out of alignment or out of flatness of the end of the cartridge. Additionally, the closed cell configuration provides sealing between cells through which the fluid cannot seep or flow. The use of a solid polymeric gasket would be inadequate because although it might bond to the filter element by the mere heating of the end of the cartridge, it would either completely melt and deform and/or would not provide sufficient resiliency for the sealing edges of the filter housing to embed therein.

The filter housings used in conjunction with the filter element of this invention are well known in the art. Portions of such a housing are depicted in FIGS. 2-4.

As shown in FIG. 2, the filter element 10 is intended to be clamped endwise between the heads of the filter housing, generally 18. Since filtration through the element 10 is affected by maintaining a substantial pressure differential between the outside 12 and inside 14 of the filter 10, it is essential that the filter element 10 have a sufficient degree of compressive strength and/or hardness to withstand deformation under the loads to be applied thereto.

Figure 3:
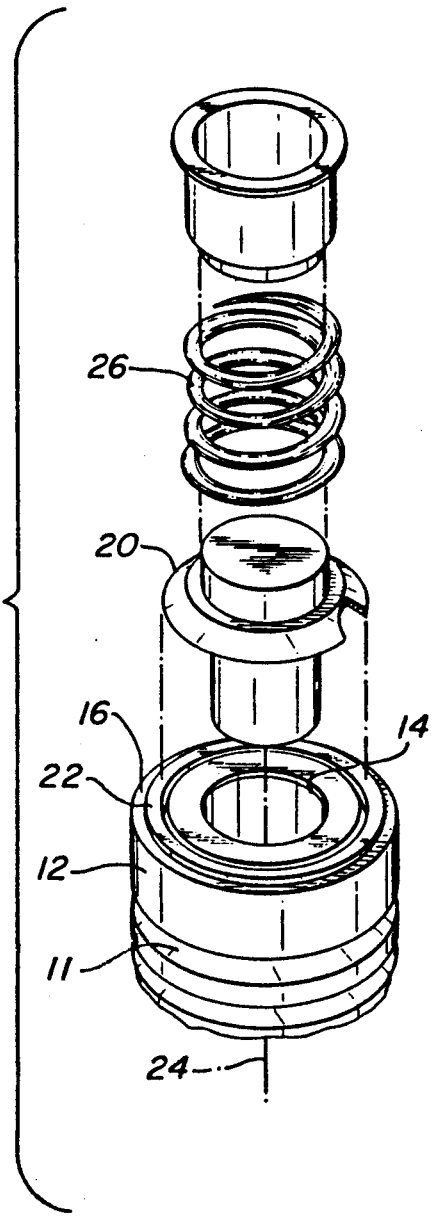
FIG. 3 is a perspective view of one end of the filter element of this invention showing a means for securing the sealing edge of the filter housing thereon.
Figure 4:
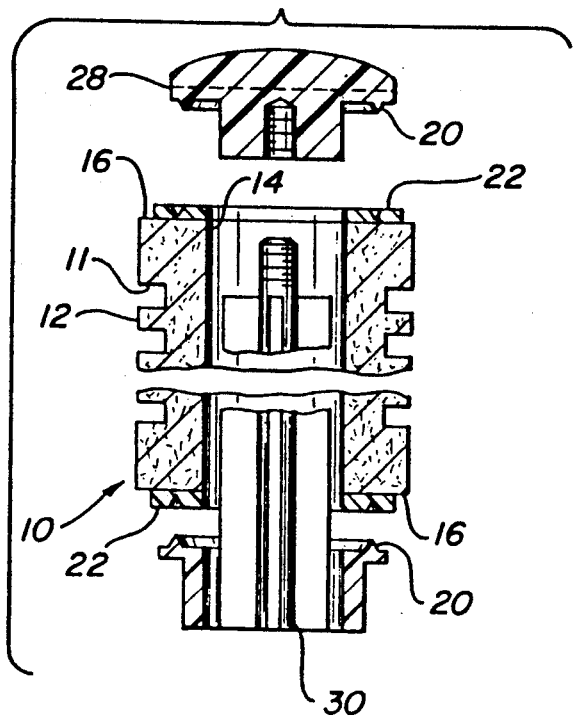
FIG. 4 is a cross-sectional view of the filter element of this invention showing another means for securing the sealing edge of the filter housing thereon.

Still referring to FIG. 2 and additionally FIG. 3, a plurality of filter elements 10 are disposed in the filter housing as indicated, with the sealing edges 20 of the filter housing which are typically circular knife edges concentric to the axis 24 of the filter element 10, embedding into the gasket 22 on the element 10. FIGS. 2, 3 and 4 depict well known means for securing and sealing the filter element 10 in the filter housing and sealingly engaging the sealing edge 20 against the end 16 of the filter element 10 which has thereon gasket 22.

FIG. 2 shows one type of housing 18 wherein the sealing edges 20 of the housing 18 embed themselves in the gasket 22 to provide sufficient sealing to prevent by-pass of the fluid from outside of the filter element into the center of the filter element. In FIG. 3, is a preferred embodiment the sealing edges 20 of the filter housing are spring compressed by spring 26 against the gasket 22 to form an appropriate seal, the gasket 22 being effective to provide adequate sealing between the sealing edges 20 and the end 16 of the filter element.

FIG. 4, depicts another embodiment wherein the sealing edges 20 are molded onto a knob 28 which is threaded unto a rod 30 going through the center of the filter 10 sealingly to compress the edges 20 into gasket 22. A similar type arrangement is on the other side of the filter element. This arrangement is then inserted into a filter housing.

Figure 5:
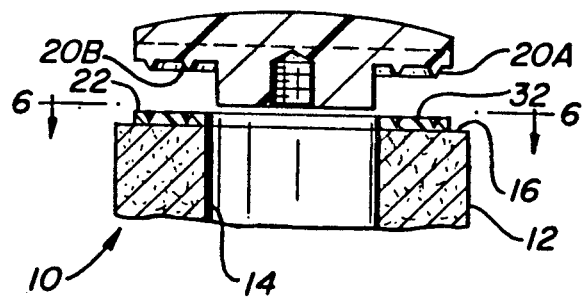
FIG. 5 is a cross-sectional view of the filter element of this invention used in conjunction with concentric sealing edges whereby by-pass of fluid around the sealing edges can easily be determined by inspection of the sealing gasket.
Figure 6:
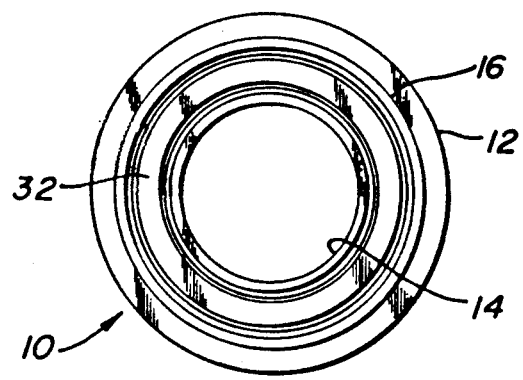
FIG. 6 is an end view of the filter element of this invention taken along line 6—6 of FIG. 5.

FIG. 5 and 6 depict another type sealing edge consisting of at least two concentric sealing edges 20 A and 20 B which when urged against the gasket 22, produces therebetween an indicia area 32 on gasket 22. After use, or after an initial test period, the adequacy of the seal is determined by mere inspection of the area 32. If there is leakage through the sealing edges 20 A and 20 B, the area between these edges will be discolored. For example if the filtering liquid or the particles contained in a liquid are of a darker color than the gasketing material, the indicia area 32 between the gasketing rings will be somewhat darker if there is leakage, but will maintain substantially the same color as the original gasket if there is no leakage.

What is claimed is:

1. A method of manufacturing filter elements, comprising:
    forming a filtering structure having at least one end adapted to coact with a filter housing;
    forming a gasket means from a preformed resilient thermoplastic polymer closed cell foam sheet, said gasket means for sealing the end of the filtering structure and coacting with the housing for the filter;
    heating the end of the filtering structure to a sufficiently high temperature adequate to form a melt surface on only one surface of the gasket sheet when the gasket is contacted to the heated end of the filtering structure; and subsequently,
    contacting the heated end of the filtering structure to one surface of the gasket, whereby the melt surface is formed from and integral with the gasket sheet on said surface and adheres the gasket to the end of the filter structure, the gasket's other surface remaining sufficiently resilient to coact with the filter housing for sealing the end of the filter.

2. The method of manufacture of claim 1, wherein the step of forming a gasket from a resilient thermoplastic polymer closed cell foam comprises the step of cutting the gasket from a sheet of resilient thermoplastic polymer closed cell foam.

3. The method of manufacture of claim 1, wherein the sufficiently high temperature is below the temperature at which the filtering structure starts to deteriorate, melt and/or fuse.

4. The filter element of claim 1, wherein the polymer is polyolefin.

5. The filter element of claim 1, wherein the polymer is polyethylene.

6. The filter element of claim 1, wherein the polymer is radiation cross-linked polyethylene.

* * * * *